United States Patent [19]

Chou et al.

[11] Patent Number: 4,859,282

[45] Date of Patent: Aug. 22, 1989

[54] ACID PURIFICATION OF PRODUCT FROM ALKALINE PEROXIDE PROCESSING OF NONWOODY LIGNOCELLULOSIC SUBSTRATES

[75] Inventors: Yu-Chia T. Chou, Wilmington, Del.; David F. Garrison, Mullica Hill, N.J.; William I. Lewis, Burlington, Canada

[73] Assignee: E. I. Du Pont de Nemours and Company, Wilmington, Del.

[21] Appl. No.: 181,771

[22] Filed: Apr. 15, 1988

[51] Int. Cl.$^4$ ................................................ D21C 9/16
[52] U.S. Cl. ........................................ 162/78; 162/60; 162/95; 162/96; 162/97; 162/99; 426/615; 426/622; 426/635; 426/636; 426/804; 426/807
[58] Field of Search ............... 162/78, 99, 76, 95, 162/96, 97, 60; 426/615, 622, 635, 636, 804, 807

[56] References Cited

U.S. PATENT DOCUMENTS

| | | | |
|---|---|---|---|
| 3,020,197 | 2/1962 | Schuber | 162/78 |
| 3,676,150 | 7/1972 | Glicksman et al. | 99/90 |
| 3,767,423 | 10/1973 | Tsantir et al. | 426/62 |
| 3,939,286 | 2/1976 | Jelks | 426/312 |
| 4,219,580 | 8/1980 | Torres | 426/549 |
| 4,237,170 | 12/1980 | Satin | 426/21 |
| 4,400,237 | 8/1983 | Kruger et al. | 162/78 |
| 4,462,864 | 7/1984 | Carles et al. | 162/56 |
| 4,649,113 | 3/1987 | Gould | 435/165 |

FOREIGN PATENT DOCUMENTS

| | | | |
|---|---|---|---|
| 0228951 | 7/1987 | European Pat. Off. | |
| 436118 | 12/1974 | U.S.S.R. | 162/78 |

OTHER PUBLICATIONS

Schumb et al., *Hydrogen Peroxide*, ACS Monograph Series, Chapter 9, pp. 515–547 (1955).
Gould, *Biotechnology and Bioengineering*, vol. 27, pp. 225–231 (1985)—"Studies on the Mechanism of Alkaline Peroxide Delignification of Agricultural Residues".

*Primary Examiner*—Peter Chin
*Attorney, Agent, or Firm*—Craig H. Evans

[57] ABSTRACT

An improved process of purifying the product from an alkaline peroxide treatment process for delignifying and bleaching nonwoody lignocellulosic agricultural residues comprising, optionally washing with water, then lowering and maintaining the pH of the substrate at less than about pH 3.0, then washing sufficiently to remove residual chemicals, separating the product from the wash liquid and, optionally, drying the product.

5 Claims, No Drawings

ACID PURIFICATION OF PRODUCT FROM ALKALINE PEROXIDE PROCESSING OF NONWOODY LIGNOCELLULOSIC SUBSTRATES

FIELD OF INVENTION

This invention relates to an improved method of washing the product from an alkaline peroxide treatment process for delignifying and bleaching nonwoody lignocellulosic agricultural residues, and more particularly to washing the product from a process for converting such residues into cellulosic fiber products suitable as a source of reduced calorie dietary fiber for human consumption.

The reduced calorie dietary fiber is characterized by high dietary fiber content and low contents of proteinaceous, fatty and ash-forming materials. It is suitable as a substitute for farinaceous flour at high replacement levels.

BACKGROUND

Various processes are known for converting woody and nonwoody lignocellulosic substrates into fibrous products suitable for ingestion by animals and humans.

Cattle, sheep and other ruminants are able to digest and grow on many kinds of cellulosic plant materials that provide little or no nourishment to humans and other monogastrics. Even the ruminants, however, have limited ability to efficiently digest lignocellulosic materials such as the leaves and stalks of grain-bearing grasses and the husks and hulls of the grain. This low conversion efficiency has been attributed to the close association of lignin with the cellulosic and hemicellulosic fibers in these materials. This lignin makes these cellulosics largely unavailable for digestion by the digestive juices and the microbes that inhabit ruminant stomachs. (See Jelks, U.S. Pat. No. 3,939,286 and Gould, U.S. Pat. No. 4,649,113).

Human inability to digest and assimilate cellulose and hemicellulose makes the substrates attractive as potential sources of dietary fiber. But, widespread use for this purpose has been hampered by the lignin that envelops the cellulosic fibers, by the highly crystalline character of the fibers and by the presence of components such as fatty substances (fats and oils) and ash-forming substances (including siliceous materials). The crystalline character imparts undesirable physical properties to foodstuffs and the fatty and ash-forming substances, especially when used in relatively high proportions, adversely effect the aroma, taste, texture and mouthfeel of food products.

One lignocellulosic material used as a dietary fiber is bran, the unbleached coarse outside covering of the seeds or kernels of cereal grains. Bran is used as fiber or roughage in some breakfast foods, breads and muffins. But, most of the bran is used in animal food, primarily because its high non-cellulosic content adds undesirable properties to many kinds of baked goods, particularly to white bread.

Low calorie flour substitutes made by grinding hulls of oats and other cereal grains (see Tsantir et al., U.S. Pat. No. 3,767,423) contain relatively large proportions of non-cellulosic components such as ash-forming substances. At desirably high flour replacement levels, food products in which they are used have a gritty aftertaste. For this reason, commercial interest has shifted largely to purified cellulose as a dietary fiber for human consumption.

Two forms of purified cellulose, both derived from wood products, are currently available. They are crystalline alpha cellulose, sold under the trade name "Solk-a-Floc", and microcrystalline cellulose, derived from alpha cellulose, sold under the trade name "Avicel". These products, however, are not entirely satisfactory as flour substitutes (See Glicksman et al., U.S. Pat. No. 3,676,150; Satin, U.S. Pat. No. 4,237,170; Tsantir et al., U.S. Pat. No. 3,767,423; and Torres, U.S. Pat. No. 4,219,580). The taste and texture of baked goods is adversely effected at flour replacement levels greater than about 20 percent.

Gould, U.S. Pat. No. 4,649,113 (1987), discloses a process (Gould Process) for converting nonwoody lignocellulosic agricultural residues (substrate) such as wheat straw into cellulosic fiber products digestible by ruminants and microbes. Gould et al., European Patent Application No. 228951 (1987), discloses that the delignified fiber products of U.S. Pat. No. 4,649,113 are also suitable as noncaloric fiber additives to compositions intended for consumption by humans.

The Gould Process involves slurrying the substrate in aqueous hydrogen peroxide ($H_2O_2$) and alkali (NaOH) at a pH of 11.2 to 11.8 and a temperature of 5° to at least 60° C. The substrate is sufficiently delignified exposing virtually all the cellulosic carbohydrates. During the alkaline peroxide treatment, the pH of the reaction medium drifts upward and is controlled by the addition of acid. The $H_2O_2$ assists in the delinginfication of the substrate by oxidizing and degrading lignin to low molecular weight water-soluble compounds, principally carboxylic acids.

Gould et al. teaches that the products can serve as wheat flour substitutes at high (30% or more) replacement levels.

Although attractive as a means of converting substrates to food formulations for ruminants and humans, the Gould Process is not entirely satisfactory for commercial use. It requires rather high concentrations of both $H_2O_2$ and NaOH based on the substrate and suffers high and losses of $H_2O_2$ through nonfunctional (nonproductive) decomposition to oxygen gas ($2\ H_2O_2 \leftarrow 2\ H_2O + O_2$). Also, we have found that the process when used to treat difficult substrates such as oat hulls results in a rapid decrease in the concentration of the $H_2O_2$, accompanied by excessive initial foaming of the reaction mixture, and the production of products that have undesirable quality (brightness, taste and aroma) for human consumption.

Decomposition of $H_2O_2$ in a highly alkaline heterogeneous reaction medium, such as when a particulate substrate is present, is not too surprising for a couple of reasons. First, $H_2O_2$ is known to be unstable in alkali, particularly at high pH. Second, heterogeneous $H_2O_2$ decomposition into $H_2O$ and $O_2$ (catalyzed by solid surfaces) is generally far faster than homogeneous decomposition (catalyzed by a variety of soluble, mostly cationic substrates), with the rate increasing in proportion to the surface area of the solids (see Schumb et al., *Hydrogen Peroxide*, ACS Monograph Series, New York, Rheinhold (1955) pp 521–522).

In a copending application to Jayawant (No. CH-1459) assigned to E. I. du Pont de Nemours & Company, an improvement over the process of U.S. Pat. No. 4,649,113 is taught for converting nonwoody substrates, particularly nonwoody lignocellulosic agricultural residues, into cellulosic fiber products useful as a source of carbohydrates digestible by ruminants and as a source of low calorie dietary fiber ingestible by humans. The process broadly comprises treating lignocellulosic substrates in an aqueous solution of strong alkali (Alkaline, Peroxide-Free Stage) for a period of time prior to the addition of peroxide (Alkaline-Peroxide Stage).

In a copending application to Chou et al. (No. CH-1514) assigned to E. I. du Pont de Nemours & Company, a further improvement over the process of U.S. Pat. No. 4,649,113 is taught. In that application, the process broadly comprises separating the substrate from the alkaline liquor following the Alkaline, Peroxide-Free Stage, reslurrying the substrate and treating it in the Alkaline-Peroxide Stage at a pH of 8.5 to 11.0.

Both the copending applications and U.S. Pat. No. 4,649,113 are incorporated herein by reference.

BRIEF DESCRIPTION OF THE INVENTION

It has now been found that the product of the copending applications (Nos. CH-1459 and CH-1514) as well as that of U.S. Pat. No. 4,649,133 can be significantly brightened, ash content can be lowered and any hydrogen peroxide or alkali metal ions and water-soluble organic compounds that might be present with the product can be minimized by acid washing the product separated from the alkaline-peroxide liquor. Further steps of hydrogen peroxide decomposition required to make a product for human consumption can be avoided. Baked products made from flours having the resulting product present in high replacement levels (greater than 20 percent and even at levels as high as 40 percent) have been found to perform well in bake tests achieving high bake scores with particularly good aroma and taste.

Sufficient dilute acid should be used to lower and maintain the pH of the bleached, delignified non-woody lignocellulosic material at less than about 3.0 for a sufficient time and under conditions that assure full soaking of the substrate with acid at that pH. Following the acid soak time, the product is washed one or more times to sufficiently remove water-soluble organic compounds and residual chemicals, including free acids, and the product is dried. Preferably the pH after the removal of the residual chemicals, that is, after the last wash is about 4.0 to 7.0.

DETAILED DESCRIPTION OF INVENTION

The invention comprises an improved process for improving the fiber products from a process for converting a nonwoody lignocellulosic material (Substrate) into products digestible by ruminants and ingestible by humans. In particular, the process's main advantage is that is substantially brightens the product and lowers ash, hydrogen peroxide and alkali metal ion content which is desirable for dietary human foods. By improving the fiber product, the baked products made therefrom are also improved. The process comprises the following steps:

(a) Upon completion of the alkaline peroxide treatment, separating the insoluble cellulosic fiber product from the aqueous alkaline peroxide phase and optionally washing it with water one or more times to remove residual chemicals including alkali metal base and water-soluble compounds, (b) After optional initial water washes, adding enough acid to lower the pH to less than about 3.0, preferably 2.0–2.5, (c) Holding the product at that pH with adequate mixing to assure full soaking of the product for a time sufficient to remove chemical residues and enhance product brightness, (d) Following the hold time at the low pH, washing the product a sufficient number of times to remove chemical residues, including free acids, and water-soluble compounds, and (e) Separating the product from the wash liquid, and (f) Preferably drying the separated product.

Any aqueous mineral acid or organic acid that is non-toxic, such as hydrochloric, nitric, sulfuric, citric, tartaric and acetic acid, can be used. Preferably hydrochloric acid is used.

Preferably the acid added is dilute having a pH of about 2. Stronger acids may be added in that they can effectively brighten the product and remove undesired components. Stronger acids (pH's below 2), however, may cause the pH of the soaked substrate to be lowered to less than 2.0. While this is within the range of equivalents envisioned, a significantly higher number of washes, with an economic penalty, will be needed to remove the residual chemicals, including free acids, if the pH of the substrate is lowered to less than 2.0.

The pH of the soaked substrate should be lowered to less than about 3, preferably between about 2.0 and 2.5. The pH of the substrate and the pH of the filtrate will be approximately equal when the substrate is fully soaked.

With normal mixing, about 15 to 30 minutes should be sufficient to assure full soaking of the product. With high efficiency mixing, shorter soak times can be used.

Temperature of the soaking step is not critical and can be room temperature (23° to 25° C.) or higher. At higher temperatures, shorter soak times can be used.

Washing preferably is done with fresh process water. The sufficiency of the washing step to remove the chemical residues, including free acids, can be measured by techniques known to those skilled in the art. For example, conductivity or pH measurement can be used. The conductivity of the liquid leaving the last wash being close to the conductivity of the "pure" wash liquid entering that wash indicates that most of the chemical residue has been removed. The preferred pH at the end of the last wash preferably is 4.0 to 7.0.

The separated product preferably is dried in any conventional drier such as a rotary drier, a fluid bed drier, a pan drier or a spray drier. More preferably, the separated product is dewatered, for example, by pressing or by centrifugation before being dried in the drier. Drying temperatures depend on the type of drier but should be high enough to efficiently dry, but low enough to avoid charring or darkening of the product. Preferably, product temperatures should not exceed 105° C.

For human dietary fiber products, in addition to removal of lignin, removal of residual nutritive proteins fats oils and ash-formers is important. Reducing the nutritive content is needed if the product is to qualify as "dietary", that is, as a low calorie or non-fattening food. Reducing fats, particularly unsaturated fats, is needed to avoid objectionable aroma and a rancid taste in baked goods. Reducing the ash-forming substances is needed to avoid objectionable mouthfeel (gritty taste and texture) in baked goods.

The dried product can be ground for use as a dry ruminant feedstuff or dietary fiber for substitution at high replacement levels in flour used to make cakes, breads, pasta, pizza and other baked goods for human consumption. It can also be generally used in foods as a process aid, a anticaking agent, a binding agent or carrier. It can be used as a pharmaceutical excipient.

Particularly in the case of a dietary fiber, the product of this invention is preferably fine ground by itself or co-ground with the regular flour with which it ultimately is to be mixed. Degree of grinding effects mouthfeel of baked products containing the fiber. Regular flour can be any flour such as wheat flour, corn flour, rice flour, rye flour or oat flour and need not be from the same plant as the fiber of this invention. The co-grinding or milling may optionally be done after preblending the product and the grain. The blending and grinding preferably are performed in a manner to give uniformly distributed mixtures of regular and dietary fiber flours.

In preferred embodiments of the invention, flour substitutes having low levels (in weight %) of proteins (less than 1), fatty substances (less than 0.1) and ash-forming substances (less than 2.5) including the siliceous material, taken as $SiO_2$, (less than 1) and high brightness are produced. Also, products with low levels of alkali metal ion (about 100 ppm as $Na^+$) and of hydrogen peroxide (less than 3 ppm) are produced.

In preferred embodiments of the invention designed to provide bleached cellulosic fiber products for use as low calorie dietary flour substitutes, the degree of whiteness of the bleached product, or its brightness value, should be high to meet the demands of the white flour industry. The brightness, as determined with a Hunter Color Difference Meter, Model D-2, of the dry product tamped flush with the rim of a round 6 cm diameter by 1.8 cm deep metal can, should be at least about 75, preferably about 80 or more. In comparison, the unbleached substrates have brightness values around 65 or less.

EXAMPLES

The following examples are intended only to further illustrate the invention and are not intended to limit the scope of the invention.

Examples 1 to 9 show the process of copending application to Chou et al. (No. CH-1514) including recycle of both the alkali and the peroxide and the acid washing of delignified and bleached oat hulls claimed in this application (No. CH-1564). Examples 10 to 14 show the treatment of product made according to the process of copending application to Jayawant (No. CH-1459) and that the brightness enhancement depends on the pH obtained with the acid wash. Example 15 shows the results of bake tests using product made according to Examples 1 to 9 at high replacement levels (40 weight %).

EXAMPLE 1

One hundred grams (oven-dried weight) at 91.3% consistency of slightly shredded oat hulls having a small amount of fines (109.5 grams) were added to 890.5 grams of process water obtained from a city potable water supply to make a 10 wt. % slurry. The slurry was stirred at room temperature (23°–25° C.) for 15 minutes and then filtered without pressing.

The filtered solids were then reslurried in enough process water to make a 1000 gram slurry which was heated to 65° C. Sodium hydroxide (20.5 grams of 48.8 wt. % NaOH solution) was added to the slurry and stirred for ½ hour at 65° C. and a pH of 11.86. On a 100 wt. % basis, the NaOH added was 10 wt. % of the dry weight of the hulls. The solids were then filtered without pressing. The filtrate (Alkaline Filtrate) was saved for recycling.

The wet solids were then reslurried in enough process water to make a 1000 gram slurry which was heated to 65° C. and found to have a pH of 10.84. Hydrogen peroxide (21.5 grams of a 32.6 wt. % $H_2O_2$ solution) was then added to the slurry which was stirred for 2 hours with the temperature controlled at about 65° C. (temperature varied from 63° to 65° C.). On a 100 wt. % basis, the $H_2O_2$ added was 7 wt. % of the dry weight of the hulls. The pH was measured every 15 minutes. It dropped to 9.22 by the end of the 2 hours.

At the end of the 2 hours, the solids were filtered but not pressed and the filtrate was saved for recycling (Peroxide Filtrate). The residual concentration of hydrogen peroxide in the filtrate was 0.6530% compared to the theoretical concentration that would result if all of the hydrogen peroxide were recovered (0.7606%).

The filter cake was then washed five times with 500 milliliters of process water. Following the fifth wash, the filter cake was reslurried in process water to make 1000 grams of slurry. Enough hydrochloric acid was added to lower the pH to and maintain it at 2.2 to 2.4 for 15 minutes. The solids were then filtered but not pressed (except for the last wash) and washed five times with 500 ml of process water each time. After the last wash, the solids were pressed to remove as much liquid as possible and then dried in a fluid bed dryer.

The dried product was found to have a brightness of 77.5, an ash content of 1.99%, a sodium ion content of 71 parts per million (ppm), a $SiO_2$ content of 0.82%, and hydrogen peroxide content of 2.7 ppm. Yield loss was 29.3%.

EXAMPLE 2

The procedure of Example 1 was repeated except that recycled NaOH and $H_2O_2$ were used. Instead of fresh NaOH solution, 655.3 grams (2.8 grams of 100% NaOH) of the Alkaline Filtrate from Example 1 was used. 14.8 grams of fresh 48.8% NaOH solution (7.2 grams of 100% NaOH) was added to adjust the NaOH concentration to 10 wt. % of the dry weight of the hulls. Instead of fresh $H_2O_2$ solution, 495.2 grams (3.2 grams of 100% $H_2O_2$) of the Peroxide Filtrate from Example 1 was used. 11.7 grams of fresh 32.6% $H_2O_2$ solution (3.8 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.5543% compared to the theoretical concentration that would result if all of the hydrogen peroxide were recovered (0.7606%).

The dried solids were found to have a brightness of 78.8, an ash content of 2.47%, a sodium ion content of 134 ppm, a $SiO_2$ content of 0.98%, and hydrogen peroxide content was non-detectable. Yield loss was 30.2%.

EXAMPLE 3

The procedure of Example 1 was repeated except that recycled NaOH and $H_2O_2$ were used. Instead of fresh NaOH solution, 663.9 grams (3.19 grams of 100% NaOH) of the Alkaline Filtrate from Example 2 was used. 11.9 grams of fresh 48.8% NaOH solution (5.8 grams of 100% NaOH) was added to adjust the NaOH concentration to 9 wt. % of the dry weight of the hulls.

Instead of fresh $H_2O_2$ solution, 461.3 grams (2.4 grams of 100% $H_2O_2$) of the Peroxide Filtrate from Example 2 was used. 14.1 grams of fresh 32.6% $H_2O_2$ solution (4.6 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.6156% compared to the theoretical concentration that would result if all of the hydrogen peroxide were recovered (0.7606%).

The dried solids were found to have a brightness of 77.3, an ash content of 2.03%, a sodium ion content of 123 ppm, a $SiO_2$ content of 0.77%, and hydrogen peroxide content of 2.2 ppm. Yield loss was 26.7%.

EXAMPLE 4

The procedure of Example 1 was repeated except that recycled NaOH and $H_2O_2$ were used. Instead of fresh NaOH solution, 645.7 grams (5.3 grams of 100% NaOH) of the Alkaline Filtrate from Example 3 was used. 11.9 grams of fresh 48.8% NaOH solution (5.3 grams of 100% NaOH) was added to adjust the NaOH concentration to 8 wt. % of the dry weight of the hulls. Instead of fresh $H_2O_2$ solution, 559.1 grams (2.9 grams of 100% $H_2O_2$) of the Peroxide Filtrate form Example 3 was used. 12.6 grams of fresh 32.6% $H_2O_2$ solution (4.1 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.4948% compared to the theoretical concentration that would result if all of the hydrogen peroxide were recovered (0.7606%).

The dried solids were found to have a brightness of 77.3, an ash content of 2.20%, a sodium ion content of 123 ppm, a $SiO_2$ content of 0.83%, and hydrogen peroxide content was non-detectable. Yield loss was 25.9%.

EXAMPLE 5

The procedure of Example 2 was repeated except that recycled NaOH and $H_2O_2$ were used. Instead of fresh NaOH solution, 661.2 grams (2.6 grams of 100% NaOH) of the Alkaline Filtrate from Example 4 was used. 13.1 grams of fresh 48.8% NaOH solution (6.4 grams of 100% NaOH) was added to adjust the NaOH concentration to 9 wt. % of the dry weight of the hulls. Instead of fresh $H_2O_2$ solution, 699.1 grams (2.7 grams of 100% $H_2O_2$) of the Peroxide Filtrate from Example 4 was used. 13.2 grams of fresh 32.6% $H_2O_2$ solution (4.3 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.3552% compared to the theoretical concentration that would result if all of the hydrogen peroxide were recovered (0.7606%)

The dried solids were found to have a brightness of 76.8, an ash content of 1.82%, a sodium ion content of 127 ppm, a $SiO_2$ content of 0.67%, and hydrogen peroxide content of 1.9 ppm. Yield loss was 27.8%.

EXAMPLE 6

The procedure of Example 1 was repeated except that recycled NaOH and $H_2O_2$ were used. Instead of fresh NaOH solution, 642.2 grams (2.9 grams of 100% NaOH) of the Alkaline Filtrate from Example 5 was used. 14.5 grams of fresh 48.8% NaOH solution (7.1 grams of 100% NaOH) was added to adjust the NaOH concentration to 10 wt. % of the dry weight of the hulls. Instead of fresh $H_2O_2$ solution, 489.5 grams (1.7 grams of 100% $H_2O_2$) of the Peroxide Filtrate from Example 5 was used. 16.3 grams of fresh 32.6% $H_2O_2$ solution (5.3 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.3580% compared to the theoretical concentration that would result if all of the hydrogen peroxide were recovered (0.7606%).

The dried solids were found to have a brightness of 75.3, an ash content of 1.79%, a sodium ion content of 168 ppm, a $SiO_2$ content of 0.51%, and hydrogen peroxide content was non-detectable. Yield loss was 26.1%.

EXAMPLE 7

The procedure of Example 1 was repeated except that recycled NaOH and $H_2O_2$ were used. Instead of fresh NaOH solution, 697.7 grams (3.7 grams of 100% NaOH) of the Alkaline Filtrate from Example 6 was used. 12.9 grams of fresh 48.8% NaOH solution (6.3 grams of 100% NaOH) was added to adjust the NaOH concentration to 10 wt. % of the dry weight of the hulls. Instead of fresh $H_2O_2$ solution, 404.9 grams (1.1 grams of 100% $H_2O_2$) of the Peroxide Filtrate from Example 6 was used. 18.1 grams of fresh 32.6% $H_2O_2$ solution (5.9 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.5098% compared to the theoretical concentration that would result if all of the hydrogen peroxide were recovered (0.7606%).

The dried solids were found to have a brightness of 77.0, an ash content of 1.68%, a sodium ion content of 115 ppm, a $SiO_2$ content of 0.66%, and hydrogen peroxide content of 2.5 ppm. Yield loss was 26.1%.

EXAMPLE 8

The procedure of Example 1 was repeated except that recycled NaOH and $H_2O_2$ were used. Instead of fresh NaOH solution, 656.7 grams (3.6 grams of 100% NaOH) of the Alkaline Filtrate from Example 7 was used. 13.1 grams of fresh 48.8% NaOH solution (6.4 grams of 100% NaOH) was added to adjust the NaOH concentration to 10 wt. % of the dry weight of the hulls. Instead of fresh $H_2O_2$ solution, 474.1 grams (2.2 grams of 100% $H_2O_2$) of the Peroxide Filtrate from Example 7 was used. 14.7 grams of fresh 32.6% $H_2O_2$ solution (4.8 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.5262% compared to the theoretical concentration that would result if all of the hydrogen peroxide were recovered (0.7606%).

The dried solids were found to have a brightness of 77.8, an ash content of 1.55%, a sodium ion content of 165 ppm, a $SiO_2$ content of 0.47%, and hydrogen peroxide content was non-detectable. Yield loss was 27.9%.

EXAMPLE 9

The procedure of Example 1 was repeated except that recycled NaOH and $H_2O_2$ were used. Instead of fresh NaOH solution, 672.8 grams (3.8 grams of 100% NaOH) of the Alkaline Filtrate from Example 8 was used. 12.7 grams of fresh 48.8% NaOH solution (6.2 grams of 100% NaOH) was added to adjust the NaOH concentration to 10 wt. % of the dry weight of the hulls. Instead of fresh $H_2O_2$ solution, 680.9 grams (2.7 grams of 100% $H_2O_2$) of the Peroxide Filtrate from Example 8 was used. 13.2 grams of fresh 32.6% $H_2O_2$ solution (4.3 grams of 100% $H_2O_2$) was added to adjust the $H_2O_2$ concentration to 7 wt. % of the dry weight of the hulls.

At the end of the 2 hours, the solids were filtered but not pressed and the filtrate was saved for recycling (Peroxide Filtrate). The residual concentration of hydrogen peroxide in the filtrate was 0.4780% compared to the theoretical concentration that would result if all of the hydrogen peroxide were recovered (0.7606%).

The dried solids were found to have a brightness of 76.7, an ash content of 1.55%, a sodium ion content of 153 ppm, a $SiO_2$ content of 0.53%, and hydrogen peroxide content of 1.1 ppm. Yield loss was 29.8%.

EXAMPLE 10

Using the process of copending application to Jayawant (No. CH-1459) product was made for treatment in Examples 11 to 14 as follows:

One thousand grams (oven-dried weight) at 91.3% consistency of slightly shredded oat hulls having a small amount of fines (1095.3 grams) were added to 13,190.4 grams of deionized (DI) water at 65° C. to make a 7 weight percent (wt. %) consistency slurry. One hundred grams of 100 wt. % sodium hydroxide (NaOH) was then added as 225.7 grams of a fresh 44.3 wt. % NaOH solution. The pH of the slurry was about 11.45. After the hulls were uniformly wetted, 50 grams of 100% hydrogen peroxide ($H_2O_2$) were then added as 153.4 grams of a 32.6% $H_2O_2$ solution to the heated slurry. The slurry was agitated at 65° C. for 2 hours. The resulting reaction mixture had a pH of 10.35 and a $H_2O_2$ concentration of 0.0599%.

The fibrous product was filtered off in a nutsch through cheese cloth and separated into 9 bags each weighing 340 grams and one weighing 310 grams for use in the following experiments. The results of the experiments are shown in the table that follows the examples.

EXAMPLE 11

One bag was split into two samples of about 155 grams each. One (11A) was washed 4 times with 250 grams of DI water each time at room temperature. After the fourth wash, the substrate was reslurried to a total weight of 700 grams with DI water and 1.3 grams of hydrochloric acid was added dropwise to hold the pH between 5.0 and 7.0 for ½ hour. The solids were then filtered (the filtrate had a pH of 6.2) and were washed 2 times with 250 grams of DI water at room temperature.

The other sample (11B) was treated in the same manner except at a temperature of 90° C. in which case the filtrate had a pH of 5.75.

EXAMPLE 12

Substrate from one bag (340 grams) was placed in a Buchner funnel and washed four times with 500 milliliters (ml) of DI water and, then, was washed 12 times with DI water with sufficient hydrochloric acid to obtain a pH of 3.0 for the wash water. The pH of the filtrate was measured each time and found to drop to 9.16 after the first wash to 7.38 after the twelfth. The substrate was then washed 2 more times with 500 ml DI water and dried.

EXAMPLE 13

Substrate from one bag (340 grams) was placed in a Buchner funnel and washed four times with 500 ml of DI water and, then, was washed 10 times with DI water with sufficient hydrochloric acid to obtain a pH of 2.5 for the wash water. The pH of the filtrate was measured each time and found to drop to 9.18 after the first wash to 5.34 after the tenth. The substrate was then washed 2 more times with 500 ml DI water and dried.

EXAMPLE 14

Substrate from one bag (340 grams) was placed in a Buchner funnel and washed four times with 500 ml of DI water and, then, was washed 3 times with DI water with sufficient hydrochloric acid to obtain a pH of 2.0 for the wash water. The pH of the filtrate was measured each time and found to drop to 2.54 after the first wash to 2.12 after the third. The substrate was then washed 2 more times with 500 ml DI water and dried.

TABLE

| Example | Brightness(a) | Ash (wt. %) | Na+ (wt. %) | $SiO_2$ (wt. %) | $H_2O_2$ Residue (ppm) |
|---|---|---|---|---|---|
| 11A | 75.8 | 1.88 | 0.35 | 0.39 | not measured |
| 11B | 75.7 | 1.92 | 0.35 | 0.39 | not measured |
| 12 | 74.5 | 2.11 | 0.45 | 0.41 | 3.2 |
| 13 | 74.5 | 1.95 | 0.38 | 0.44 | 4.4 |
| 14 | 77.1 | 1.50 | 0.09 | 0.45 | less than 3.0 |

(a)Hunter Color Difference Meter D2 ratings.

EXAMPLE 15

Bake Tests

Suitability of the product for use as a flour substitute ultimately is determined by bake tests. The product ("Fiber") made according to the process in Examples 1 through 9 were submitted for such tests which were run according to the following procedure:

1. The product ("Fiber") was mixed with wheat (white bread) flour at a 40 weight percent replacement level.

2. Bread was made by the "Sponge and Dough" method under standard baking conditions. A sponge was first made by mixing the following ingredients in a Hobart A-120 mixer with a McDuffee bowl and a three-prong hook for 1 minute at the low (no. 1) speed and then for 1 minute at the middle (no. 2) speed at 77°±1° F.:

| Ingredients | Weight (grams) |
|---|---|
| Bakers Patent Flour | 300 |
| Fiber(a) | 200 |
| Vital Yeast Glutton | 30 |

-continued

| Ingredients | Weight (grams) |
| --- | --- |
| Mineral Yeast Food | 3 |
| PD-321 | 2.5 |
| XPANDO | 5 |
| Compressed Yeast | 15 |
| Water | 700[b] |

[a]Laboratory Pin Milled
[b]cubic centimeters

The sponge was fermented in a fermentation box for 3 hours at 86° F. and 85% relative humidity and then remixed with the following additional "Dough" ingredients for 1 minute at No. 1 speed and then to development at No. 2 speed (about 10 minutes):

| Ingredients | Weight (grams) |
| --- | --- |
| Bakers Patent Flour | 200 |
| Vital Wheat Glutton | 30 |
| Salt | 15 |
| Calcium Propionate | 2.5 |
| Compressed Yeast | 10 |
| High Fructose Corn Syrup | 35[a] |
| Water | 100[a] |
| Ascorbic Acid | 10[a] |

[a]cubic centimeters

The remixed dough was allowed to rest in the fermentation box for 10 minutes at 86° F. and 85% relative humidity and was then divided into 520 gram pieces, rounded by hand, molded in a cross grain molder and proofed at 110° F. and 81% relative humidity for about 1 hour until it had doubled in size. The loaves were then baked at 430° F. for 18 minutes in pans having top inside dimensions of 4⅜ inches by 10 inches, bottom outside dimensions of 4¼ inches by 9¾ inches and a depth of 2¾ inches.

3. A "Score" was determined for the loaves by trained laboratory personnel in the baking laboratory. They evaluated the height of the loaf (50), color (10), aroma (10), taste (10), graininess (10), and texture (10) Each criteria is measured against the maximum point value in the parentheses. The total point value for all the criteria is 100.

The bread baked using the product of the process in which no alkali or peroxide are recycled and that using the product from the recycling processes had the same bake scores. The breads predictably had decreased height, texture and graininess ratings because the fiber was laboratory pin milled. Finer grinding, particularly if the Bakers Patent Flour and the product were coground, would be expected to yield a bread with improved height, texture and graininess having a total score in excess of 90. The ratings were: Height —40, Color —8, Aroma —8, Taste —8, Graininess —6, and Texture —6 for a total score of 76. The bread had 40 calories per 28 grams.

As a comparison Colonial Standard "Lite Bread", a commercial low calorie bread containing half the fiber and having 40 calories per 21 grams was used a the standard with the following ratings: Height —50, Color —10, Aroma —10, Taste —10, Graininess —10, and Texture —10 for a total score of 100.

We claim:

1. A process for purifying the fibrous ingestible product from an alkaline peroxide process for treating and converting non-woody lignocellulosic substrates into fibrous products suitable for ingestion consisting essentially of the following steps:
   (a) Upon completion of the alkaline peroxide treatment, separating the insoluble cellulosic fiber product from the aqueous alkaline peroxide phase,
   (b) Adding enough non-toxic, aqueous mineral or organic acid to lower the pH of the product to less than 3.0,
   (c) Holding the product at that pH with adequate mixing to assume full soaking of the product for a time sufficient to remove chemical residues and enhance product brightness,
   (d) Following the hold time at the low pH, washing the product one or more times with a wash liquid to remove additional chemical residues and water-soluble compounds, and
   (e) Separating the product from the wash liquid.

2. The process of claim 1 wherein the product separated in step (e) is dried.

3. The process of claim 1 wherein the product separated in step (a) is first washed with a wash liquid one or more times to remove residual chemicals including alkali metal base and water-soluble compounds before step (b).

4. The process of claim 1 wherein the pH in step (b) is 2.0–2.5.

5. The process of claim 1 wherein the pH after the last wash in step (d) is in the range of about 4–7.

* * * * *